(12) United States Patent
Saavedra (10) Patent No.: US 9,933,775 B2
(45) Date of Patent: Apr. 3, 2018

(54) PROGRAMMABLE MATTRESS ADJUSTMENT APPARATUS AND METHOD

(71) Applicant: John A Saavedra, Irmo, SC (US)

(72) Inventor: John A Saavedra, Irmo, SC (US)

(*) Notice: Subject to any disclaimer, the term of this patent is extended or adjusted under 35 U.S.C. 154(b) by 223 days.

(21) Appl. No.: 14/955,219

(22) Filed: Dec. 1, 2015

(65) Prior Publication Data
US 2017/0150824 A1    Jun. 1, 2017

(51) Int. Cl.
| | | |
|---|---|---|
| G05B 19/10 | (2006.01) | |
| A61G 7/012 | (2006.01) | |
| A61G 7/018 | (2006.01) | |
| A61G 7/057 | (2006.01) | |

(52) U.S. Cl.
CPC ........... G05B 19/106 (2013.01); A61G 7/012 (2013.01); A61G 7/018 (2013.01); A61G 7/0573 (2013.01); A61G 2203/12 (2013.01); G05B 2219/2608 (2013.01)

(58) Field of Classification Search
CPC .................................................. G05B 19/106
USPC ...................................................... 318/3, 34
See application file for complete search history.

(56) References Cited

U.S. PATENT DOCUMENTS

| | | |
|---|---|---|
| 3,739,406 A | 6/1973 | Koetter |
| 5,224,228 A | 7/1993 | Larrimore |
| 5,410,768 A | 5/1995 | Manson et al. |
| 5,502,853 A | 4/1996 | Singleton et al. |
| 5,625,914 A * | 5/1997 | Schwab ............... A47C 21/006 297/284.1 |
| 6,106,576 A * | 8/2000 | Fromson .................. A61H 1/00 318/16 |
| 7,146,662 B1 | 12/2006 | Pollard et al. |
| 8,640,284 B2 * | 2/2014 | Farre ...................... A61G 7/002 5/600 |
| 9,066,603 B2 * | 6/2015 | Mossbeck ............ A47C 20/041 |
| 2005/0166323 A1 | 8/2005 | Kawakami et al. |
| 2009/0013469 A1 | 1/2009 | Johnson |
| 2009/0211022 A1 | 8/2009 | Harding |

* cited by examiner

*Primary Examiner* — David S Luo
(74) *Attorney, Agent, or Firm* — Southeast IP Group, LLC; Thomas L. Moses; Randolph J. Tucker (57) ABSTRACT

A bed adjustment apparatus and method includes a linear actuator attached to a bed to move a portion of a mattress. A control box activates the linear actuator based on commands and sequences received from a remote control. The control box optionally includes a PLC to store the commands and sequences. The remote control optionally communicates wirelessly with the control box. The remote control allows a user to select and send the control box commands and sequences to control the linear actuator. The sequences are pre-installed, user programmed, received from another remote, or downloaded as desired. The apparatus allows a user to alleviate pressure points during sleep without requiring the user to adjust their sleeping position by adjusting the mattress based on a selected sequence.

18 Claims, 7 Drawing Sheets

PROGRAMMABLE MATTRESS ADJUSTMENT APPARATUS AND METHOD

BACKGROUND

It is well known that the average person tends to reposition himself or herself several times per hour while sleeping. One common reason for a person to reposition himself or herself during sleep is to relieve pressure points. No matter what position a person assumes while sleeping, that position causes pressure points to develop and the longer a person remains in that same position, the more noticeable and painful the pressure points become. However, repositioning, e.g., rolling over, to relieve pressure points can interfere with the restful sleep of a person and that of their partner. It is therefore desirable to have an apparatus that helps to alleviate these pressure points without the need of a sleeper to reposition during sleep.

In healthcare, pressure points can lead to bed sores, also known as pressure ulcers. At best, these are an annoyance and, at worst, they can lead to infections that may become fatal. In particular, sores are a problem in paralyzed patients and, due to commonly suppressed or compromised immune systems, can put them at risk of infections. Infectious agents in hospital and health care settings are common and can be resistant to common treatments. To counter and minimize the risk of sores and accompanying infections, nursing protocols typically dictate that at risk patients should be turned every two hours, around the clock. In a hospital setting, this contributes to health care costs. In a home setting, it can lead to interrupted sleep on the part of patients and caregivers. In both settings, turning a patient can contribute to other health conditions, such as lower back strain. It is therefore desirable to have an apparatus that helps alleviate bed sores without the need for as frequent turning of patients.

Further, it is well known that a person's sleeping position can have an effect on a number of conditions, including snoring, gall bladder function, Gastro-Esophageal Reflux Disease, heart burn, intestinal gas, cardio rehabilitation, and patients recovering from burns and surgical incisions. A person may be required to sleep in a certain position due to these and similar conditions which can increase the likelihood of pressure points and discomfort. Alternatively, a person's sleeping position may exacerbate or negatively affect these conditions and similar conditions. Periodic adjustment of a sleeper's position can help reduce discomfort and some of the negative effects and conditions that arise from maintaining certain sleeping positions. It is therefore desirable to have an apparatus that helps decrease discomfort and negative health effects associated with certain sleeping positions.

Periodic adjustment of the angle of a person's mattress or a portion of the mattress can help alleviate pressure points, reduce the frequency of turning patients to prevent bed sores, and decrease discomfort and negative health effects of particular sleeping positions by changing the position and distribution of forces on the body resulting in a more restful sleep. Heretofore, many devices have been developed and commercialized to address changing positions while sleeping. For example, U.S. Pat. No. 5,410,768 discloses a method for preventing bedsores which includes rocking the patient slowly at a rocking cycle period in the range of 1 to 120 minutes. Preferably, the entire bed is rocked using a hydraulic system characterized by synchronous motion of the master cylinders and the slave cylinders at the desired rocking cycle period. A pump is disclosed characterized by 4 master cylinders for conducting the rocking. The system constitutes an attachment for a bed such as hospital bed.

U.S. Pat. No. 7,146,662 discloses a self-leveling bed support frame that provides an automatically-controlled level sleeping surface in the sleeper cab of a semi-trailer rig. The self-leveling bed support frame is comprised first of a rectangular lower frame with four pneumatic actuators in each corner. A rectangular upper frame is above the lower frame and engages at its corners with the pneumatic actuators. An automatic control system operates the four pneumatic actuators to maintain a level upper frame by utilizing two pair of mercury switches disposed on two independent control axes. Each pair of mercury switches control the positioning of a pair of the pneumatic actuators, disposed at either end of a diagonal across the upper frame. An adjustable seat back assembly is also provided which can elevate one end of a mattress on the upper frame, using a pair of scissor jack mechanisms, which provide fine control when utilized with a pneumatically controlled actuator.

U.S. Publication No. 2009/0211022 A1 discloses a device for a cot or child's bed that comprises a mattress support mounted on springs. Actuation means is provided to roll and/or rock the mattress support on the springs such that the side portions and/or the end portions of the mattress support repeatedly rise and fall. The actuation means could, for example, comprise a linear actuator, a swash plate mechanism or an air bag. Each of the above documents are hereby incorporated herein by reference, in their entireties.

However, each one of these references suffers from one or more of the following disadvantages: they are cumbersome, are elaborate, are expensive, have high manufacturing costs, lack programmable capability, lack a variety of programming choices, and lack ease of control. Therefore, there is a need for an apparatus and method that is of simple and inexpensive design which costs little to manufacture, install, and maintain. Additionally, there is a need for an apparatus and method that allows a sleeper access to a variety of programs for mattress adjustment and is easy to program and control.

SUMMARY OF THE INVENTION

The present invention is directed to an apparatus and method that provides an inexpensive and simple design which is easily manufactured, installed, and maintained; provides a sleeper access to a variety of mattress adjustment programs; and is easy to program and control. The apparatus and method, in one preferred embodiment, comprises a programmable mattress adjustment apparatus including a series of linear actuators attached to a mattress of a bed, wherein the linear actuators move upwardly and downwardly and are controlled by a control box. The linear actuators are used to periodically move portions of a mattress upwardly and downwardly while a user is sleeping in order to alleviate pressure points that develop on a user's body throughout the night. Alternatively, the linear actuators may be attached to a bed frame to raise and lower the bed frame and thereby the mattress.

The control box preferably includes a programmable logic controller ("PLC"). The PLC of the control box may be programmed to operate the linear actuators in any desired sequence or configuration. For instance, the PLC may be programmed to simultaneously raise the left-hand side of the mattress slightly, lower the right-hand side of the mattress, and to later reverse the adjustment. Alternatively, the PLC may be programmed to randomly raise portions of the mattress while lowering others. Further, the PLC may be programmed to operate each linear actuator independently or in conjunction with one another. Additionally, the PLC may be programmed to delay the start of a desired sequence, allowing a user to fall asleep prior to operation of the linear actuators. Programming for the PLC may be pre-installed or installed by a user through an interface. It is contemplated that a PLC may include several pre-installed motion sequences but additional motion sequences may be added by a user.

The control box may also include means for receiving and/or transmitting wireless communications to and from a remote control device. This arrangement allows a user to wirelessly transmit commands or programmed sequences to the control box from the remote control. The control box follows these transmitted commands or sequences to control the linear actuators. So, a user may use the remote control to simply raise a portion of the mattress as a single, one-time command. Alternatively, the user may use the remote control to program a sequence of repeating commands to the PLC that may terminate at a pre-determined time or as instructed by the user through the remote control. Further, the remote control may be store and run a programmed sequence, in place of the PLC, thereby transmitting individual commands at programmed times in the sequence to the control box to operate each linear actuator.

Optionally, the remote control may be able to program a variety of motion sequences, record them under different names or designations, and select different sequences on different nights or as desired. Also, a user may share sequences with other users by directly transferring the sequences from one remote to another or by uploading sequences to a centrally accessible location where other users may download them as desired. For instance, a user may download sequences from a website or transfer sequences directly between his or her phone and another phone.

DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a claim, that feature can also be used, to the extent possible, in aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "mattress" is used herein to mean any size cribs, bassinets, cradles, pads, mats, pillows, cushions, standard mattresses (within the ordinary, plain meaning of the term), and any other structure desired for supporting a resting user. The term "bed frame" is used herein to mean a structure comprising one or more of a headboard, footboard, legs, rails, and mattress base, as is desired to position and support a mattress. The term "mattress base" is used herein to mean a box spring, flat platform, series of slats, or any other structure desired upon which a mattress may rest.

I. Actuators/Control Box (PLC)

Figure 1:
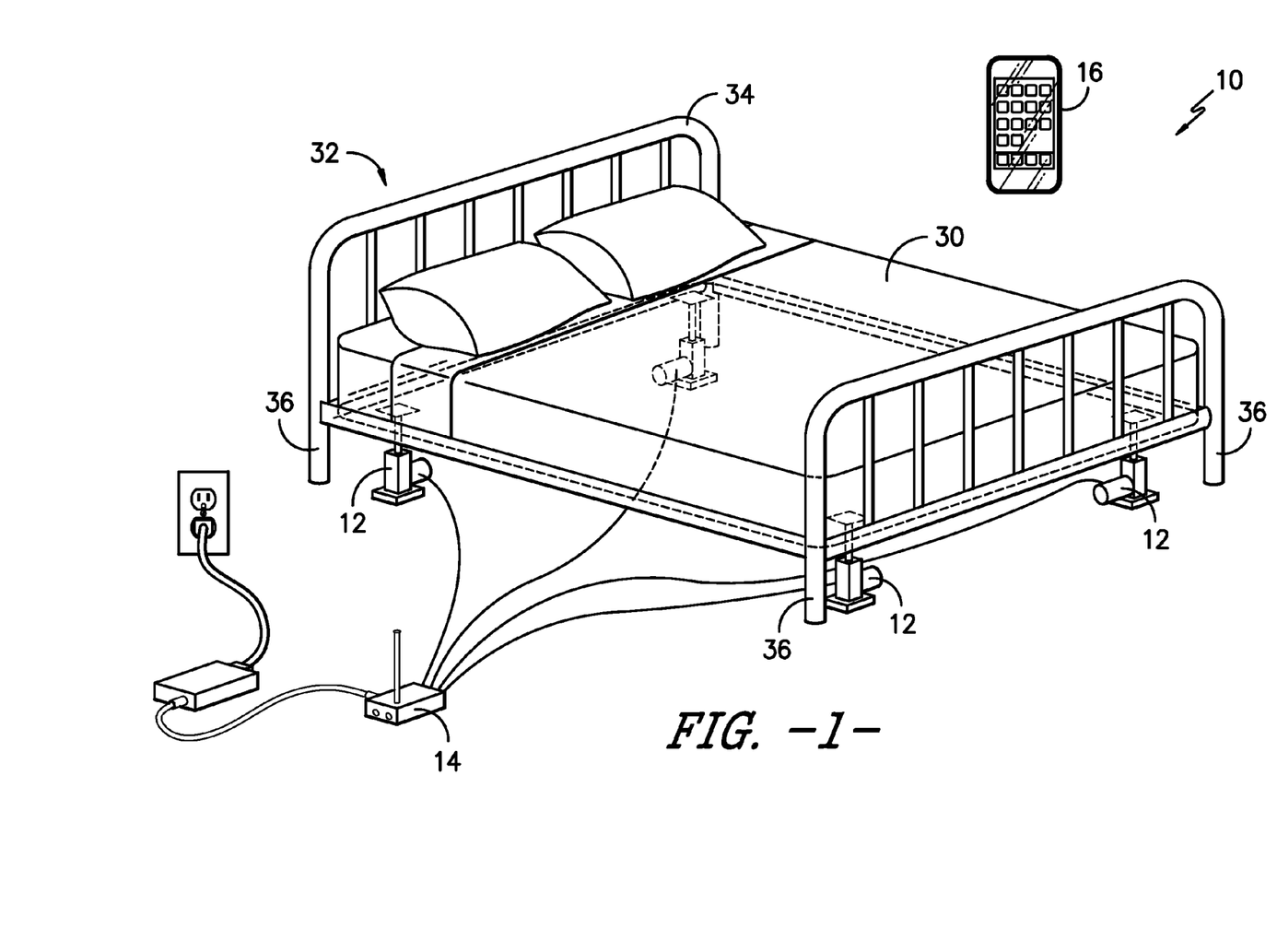
FIG. 1 is a perspective view of one embodiment of a mattress adjustment apparatus wherein the linear actuators are positioned at the corners of the mattress, linear actuators are attached to the control box, and the remote control is in wireless communication with the control box.

The programmable mattress adjustment apparatus 10 and method of the present invention includes, in a first embodiment, a series of linear actuators 12 that are attached to a mattress 30 of a bed 32 as in FIG. 1. These linear actuators 12 are used to periodically move portions of a mattress 30 upwardly and downwardly while a user is sleeping, in order to alleviate pressure points that develop on a person's body throughout the night. The linear actuators 12 are controlled by a control box 14 that preferably includes a programmable logic controller ("PLC"). In an alternative embodiment, a single linear actuator 12 may be used instead of a series.

The PLC of the control box 14 is programmed to operate the linear actuators 12 in any desired sequence or configuration. For instance, the PLC may be programmed to simultaneously raise the left-hand side of the mattress 30 slightly, lower the right-hand side of the mattress 30, and then, after a pre-determined time interval, reverse itself and raise the right-hand side of the mattress 30 while lowering the left-hand side. Alternatively, the PLC may be programmed to randomly raise portions of the mattress 30 while lowering others. The PLC can also be programmed to operate each linear actuator 12 independently or in conjunction with one another. Preferably, the programming for the PLC includes pre-installed programming. The programming for the PLC may also include an interface for user programming. Additionally, the PLC may be programmed to delay the start of a desired sequence thereby allowing a user time to fall asleep before operation of the linear actuators 12. For example, a user may program the PLC to wait 20 minutes before any movement of the linear actuators 12 so that the user may fall asleep.

II. Actuators/Mattress

Figure 4:
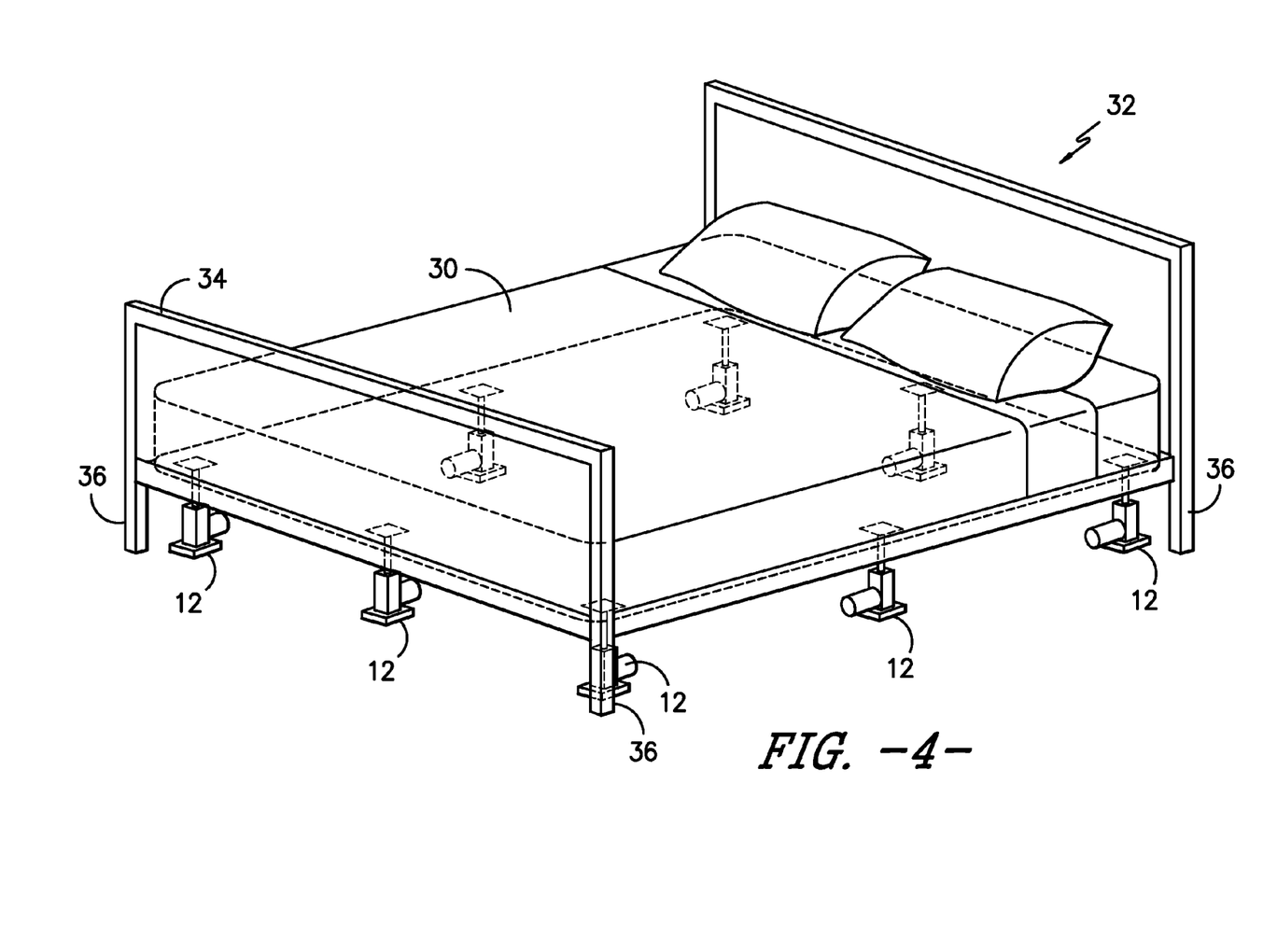
FIG. 4 is a perspective view of one embodiment of a mattress adjustment apparatus wherein the linear actuators are positioned at the middle of each edge and at the corners of the mattress.
Figure 5:
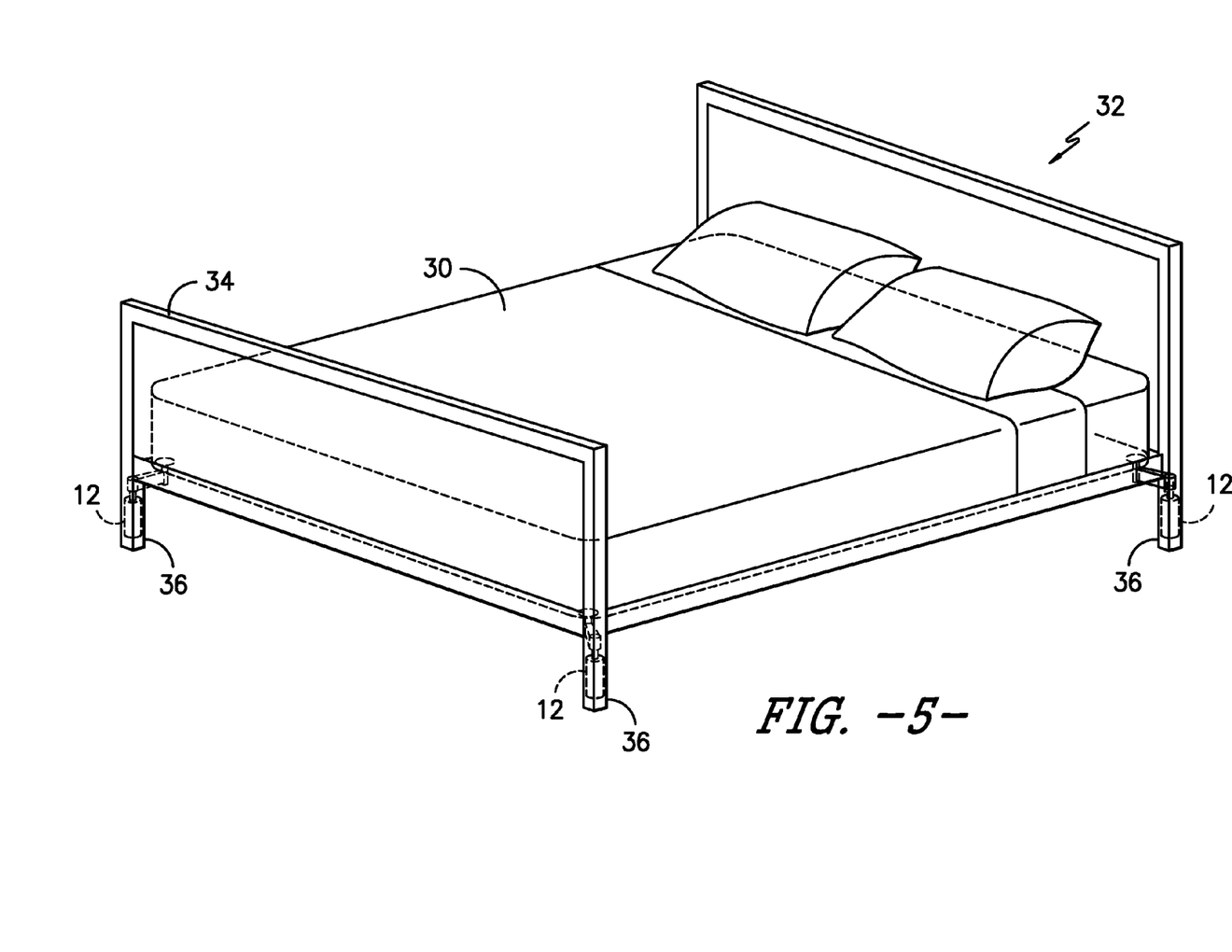
FIG. 5 is perspective view of one embodiment of a mattress adjustment apparatus wherein the linear actuators are formed within the legs of the bed frame.
Figure 6:
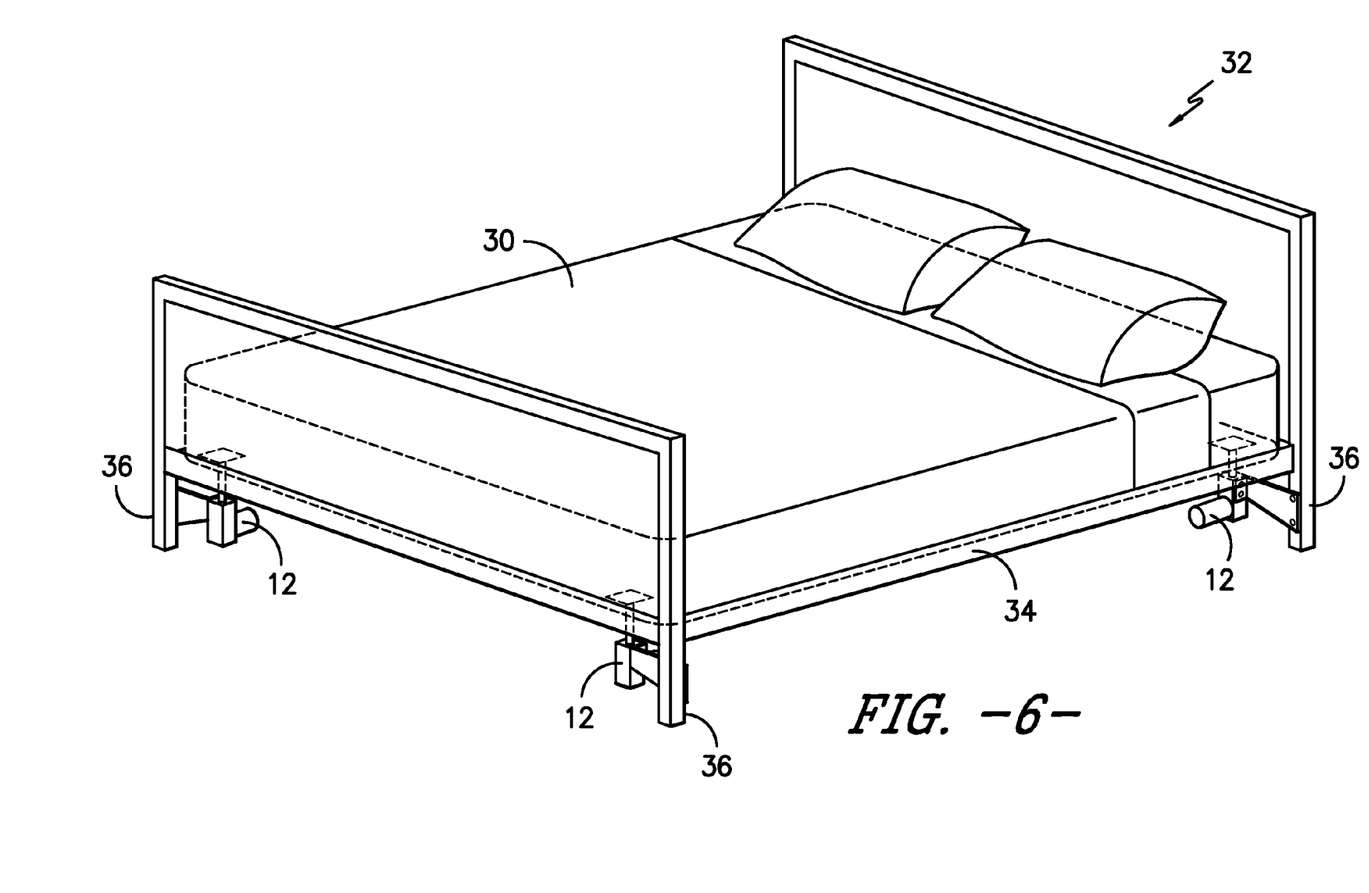
FIG. 6 is perspective view of one embodiment of a mattress adjustment apparatus wherein the linear actuators are mounted to the legs of the bed frame.

The linear actuators 12 may be used in any desired configuration with respect to the mattress 30. In one embodiment, four linear actuators 12 are positioned with one at each corner of a mattress 30 as seen in FIGS. 1, 5, and 6. In another embodiment, the four linear actuators 12 are positioned with one at the center point of each side of a mattress 30. Other embodiments may include additional linear actuators 12 as desired or as necessary to support heavier loads; for instance an embodiment may include a linear actuator at each corner and at the center points of each side of the mattress 30, as in FIG. 4. Additionally, linear actuators 12 may be employed under interior central portions of the mattress 30 along with the sides. The linear actuators 12 are preferably electro-mechanical in nature, but may also include pneumatic, hydraulic, stepper motors, or any other type of suitable linear actuator 12. Also, the linear actuators 12 may include a means for sound-proofing their driving motor. There are many means for providing sound-proofing a motor and one skilled in the art will recognize that any suitable means for sound-proofing a motor may be employed.

Figure 2:
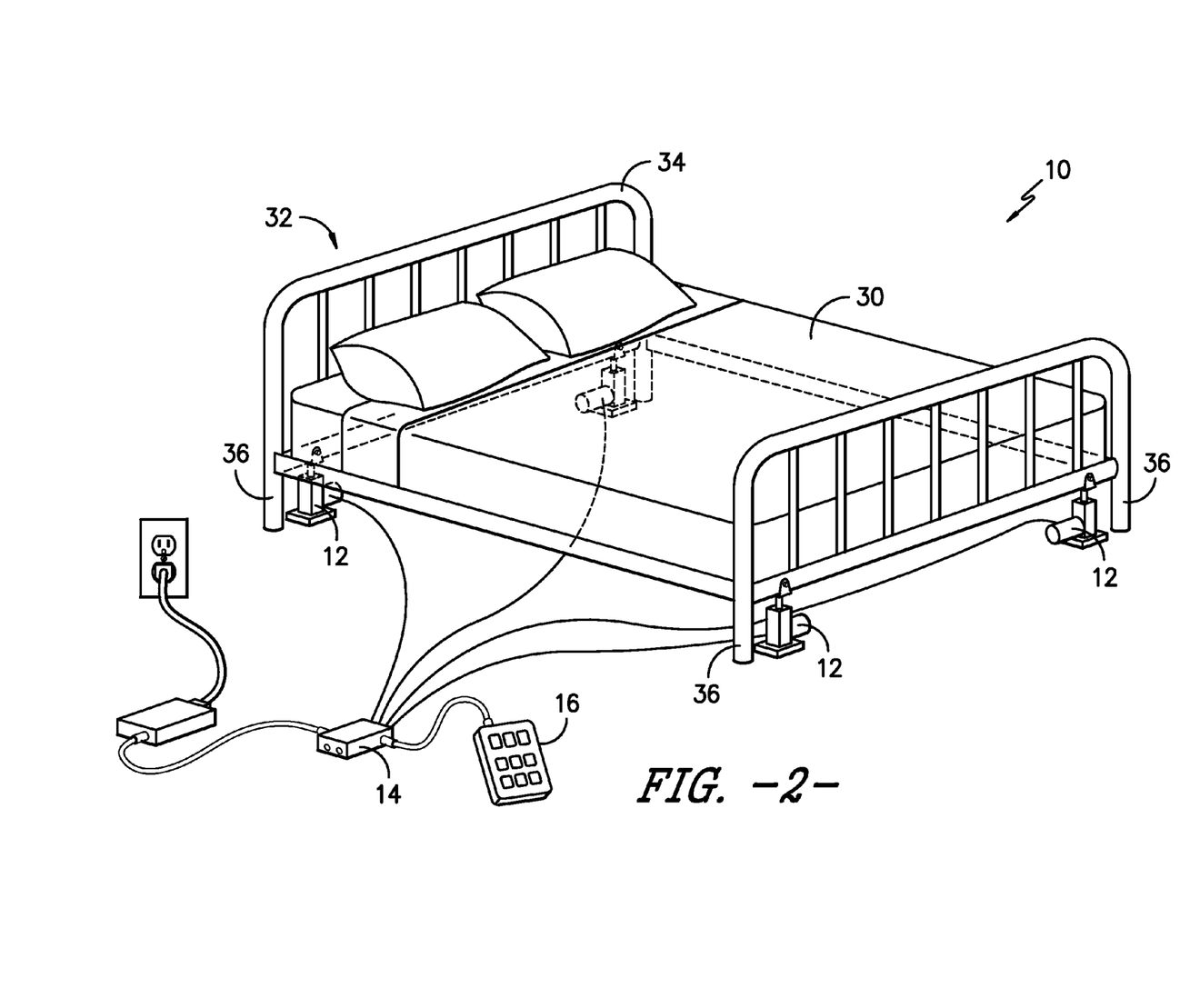
FIG. 2 is a perspective view of one embodiment of a mattress adjustment apparatus wherein the linear actuators are attached to the bed frame and the remote control is attached to the control box.
Figure 7:
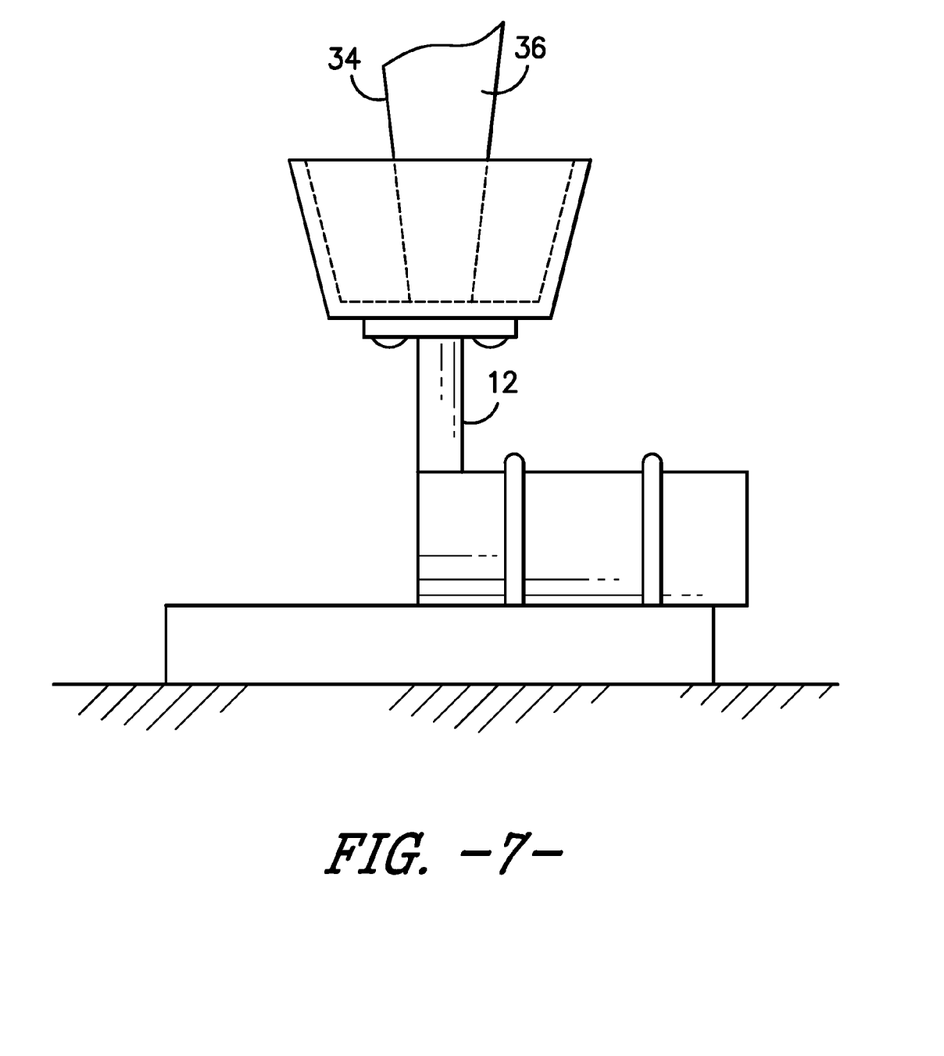
FIG. 7 is a front view of one embodiment of a mattress adjustment apparatus wherein the linear actuator is attached to a leg of a bed by insertion of the leg in a cup shaped support mounted atop the linear actuator.

It is contemplated that the linear actuators 12 may be attached to the mattress 30 directly or to the bed frame 34, to facilitate the raising and lowering of the desired portions of the mattress 30. The bed frame 34 may include a mattress base, such as a box spring, flat platform, series of slats, or any desired surface a mattress 30 may rest upon. Thereby a mattress base may be used in conjunction with other parts of a bed frame 34 to support a mattress 30. As to the bed frame 34, FIG. 2 shows how linear actuators 12 may be attached to portions of the bed frame 34 near the corners of the mattress 30 to raise and lower each or corner of the bed frame 34 and thereby the corners of the mattress 30. Additionally, FIG. 7 shows how a linear actuator 12 may be attached to each leg 36 of the bed frame 34 so each leg 36, and thereby the bed 32, rest atop linear actuators 12. In FIG. 7, a leg 36 is shown as inserted into a cup shaped support mounted atop a linear actuator 12. When utilized on each leg 36, the linear actuators 12 increase the height of the bed 32 off the floor, allowing for storage under the bed 32 and allowing each leg 36 of the bed frame 34 to be independently raised or lowered. In a further embodiment seen in FIG. 5, linear actuators 12 are formed within the legs 36 of the bed itself. The apparatus 10, particularly the linear actuators 12, may be manufactured with and sold as part of a new bed 32 or bed frame 34. Alternatively, the apparatus 10, including the linear actuators 12, may be retroactively fitted onto an existing bed frame 34 or mattress 30.

In an additional embodiment, linear actuators 12 may raise or lower select portions of a crib. The linear actuators 12 may be attached to a bed frame 34, such as a flat platform, upon which a crib rests. The flat platform may comprise a piece of plywood, steel plate, or any other desired material. Alternatively, the bed frame 34 may support a series of cribs, allowing for the adjustment of all the cribs simultaneously. The cribs may be secured to the bed frame 34 to prevent the cribs from falling off or tipping over. The apparatus 10 may be programmed to automatically raise and lower portions of the bed frame 34 in any desired sequence or combination. For example, a nursery may have an apparatus 10 wherein multiple children can rest in separate cribs that are attached to a flat platform which is slowly rocked by linear actuators 12 positioned underneath. Use of the apparatus 10 with cribs, cradles, and bassinets may provide pressure point relief and soothing motion for children.

Figure 3:
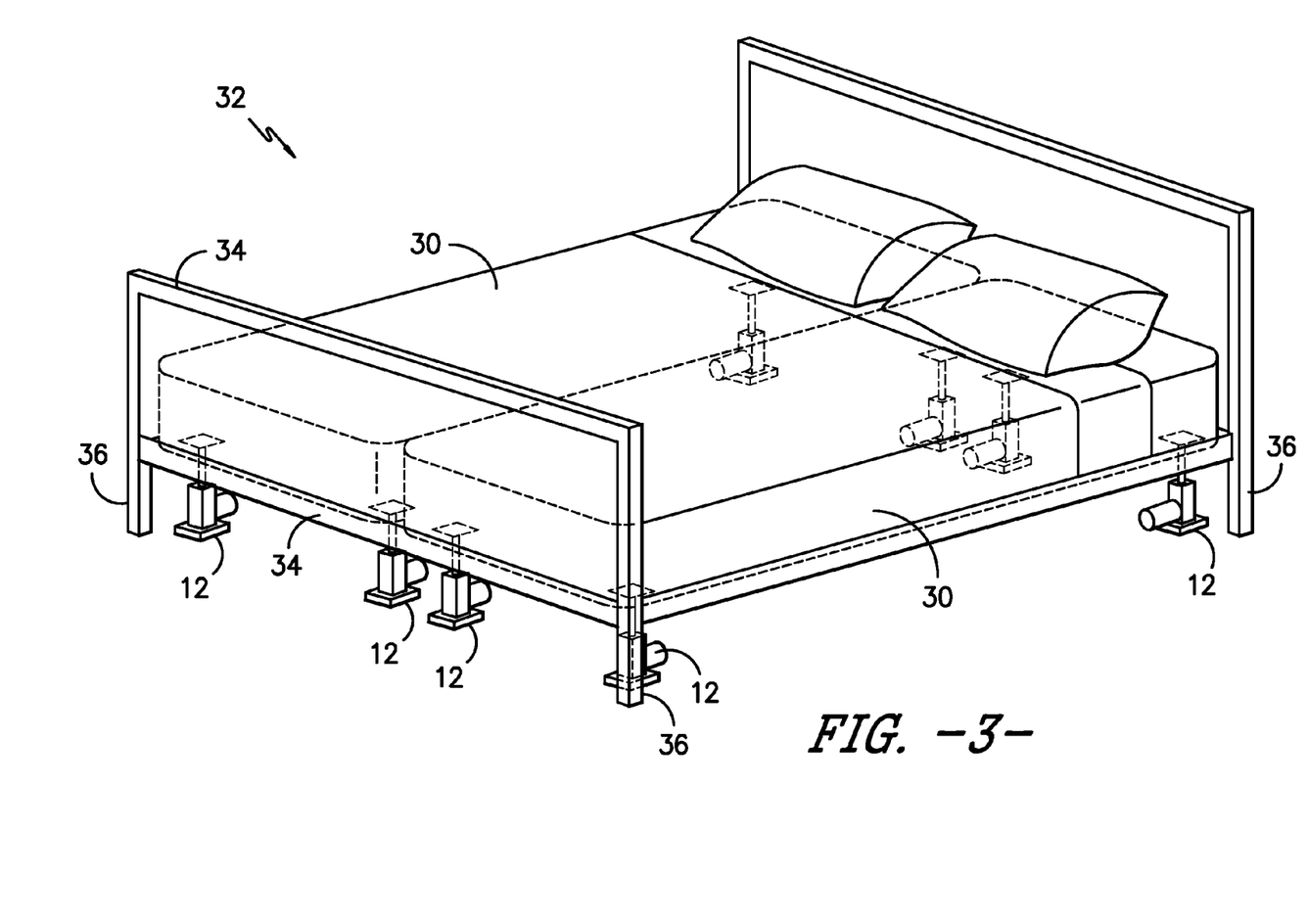
FIG. 3 is a perspective view of one embodiment of a mattress adjustment apparatus wherein the bed has two mattresses on the same bed frame to allow for independent control of each side and linear actuators positioned at the corner of each mattress.

In yet another embodiment, it is contemplated that linear actuators 12 on either side of the bed 32 are programmed and operated independently of the other side of the bed 32. For example, this arrangement allows a husband and wife to program their side of the bed 32 to move or adjust as desired, without affecting their partner's side of the bed 32. Therefore, the husband may program his side of the bed 32 to move more frequently or at greater angles, while the wife may program her side to adjust at more intermittent time intervals or at slighter angles than her husband. This arrangement may be accentuated by utilizing two separate mattresses 30 pushed together on a single bed frame 34, so that the motion of one side does not affect the other side as seen in FIG. 3. Other mattress 30 modifications may be made in order to enhance the independence of motion for each side of the bed 32, as desired.

III. Remote Control

In one preferred embodiment, the control box 14 includes means for receiving and/or transmitting wireless communications to and from a remote control device 16 as seen in FIG. 1. This arrangement allows a user to use a remote control device 16 to wirelessly transmit commands or programmed sequences to the control box 14, which in turn operates the linear actuators 12 to follow the wirelessly transmitted commands or sequences. For instance, a user can use the remote control 16 to simply raise a portion of the mattress 30, such as the head or the foot of the mattress 30, as a single, one-time command. Alternatively, the user may use the remote control 16 to program a sequence of repeating commands that may continue until either terminated at a pre-determined time or by the user through the remote control 16. When the control box 14 includes a PLC, the sequences may be transmitted to and stored by the PLC so the control box 14 may continue to operate the linear actuators 12 as programmed, even when not in constant communication with the remote control 16. Alternatively, the remote control 16 may store and run a programmed sequence in place of the PLC by transmitting individual commands to the control box 14 at programmed times to operate the linear actuators 12 according to the programmed sequence. The sequences may include anything from a constant rocking motion to intermittent adjustment of linear actuators 12. Also, sequences may include adjustment of individual linear actuators 12, coordinated groups of linear actuators 12, or any combination thereof.

The remote control device 16 may be a dedicated device, similar to a television remote control, a computer, or a computing device, such as a mobile phone or tablet. In one preferred embodiment, software commonly referred to as an "app" is loaded onto a mobile phone or tablet, such as an iPad, so that the mobile phone or tablet may be used as the remote control device 16. The app may include a graphical layout of each actuator 12 in relation to the mattress which a user may use to easily program the sequence by activating each linear actuator 12 individually in a desired sequence. Further, the app may include means for actuating a group of linear actuators 12 simultaneously. The user may also program the time intervals between linear actuator 12 adjustments, the magnitude, height, and the direction, either upward or downward, of each adjustment, and delays in starting any sequence of adjustment. It is contemplated that many different interfaces and methods for programming the remote control 16, control box 14, as well as the PLC, may be developed and employed.

IV. Recording of Motion

In one embodiment, the remote control 16 includes various types of sensors, such as accelerometers and gyroscopes, which are sensitive to motion. Such sensors are commonly used in mobile phones, tablets, and other devices, such as Fitbits. A remote control 16 with such sensors may be used to record motion, such as the slow rocking motion of a boat at anchor, for some time period and may translate that recording into instructions to be fed into the PLC. In this way, the PLC of the control box 14 is easily programmed to mimic the recorded motion, such as a boat at anchor, so that the mattress 30 moves in the same way overnight. When the PLC reaches the end of the recorded motion, it may start the sequence over again, in repeating fashion, until terminated or instructed otherwise.

V. Sequence Sharing

One optional feature of the programming is the ability to program a variety of different motion sequences, record them under different names or designations, and select different sequences on different nights or as desired. Further, it is contemplated that users may share programmed sequences with other users, either by directly transferring the sequences from one remote control 16, e.g., a mobile phone, to another, or by uploading their sequences to a centrally accessible location, e.g., a website, where other users may download them as desired.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

What is claimed is:

1. A mattress adjustment apparatus comprising:
   at least one linear actuator for raising and lowering a portion of at least one mattress;
   a control box operatively connected to said linear actuator in order to control said linear actuator;
   a remote control in communication with said control box so that a user can transmit said control box commands and sequences with said remote control;
   wherein said remote control comprises a wireless mobile communication device with software to receive instructions and motion sequences from said user and transmit said commands and said sequences to said control box; and
   wherein said control box is programmed for periodic and automatic adjustment of said linear actuator.

2. The mattress adjustment apparatus set forth in claim 1, further including a plurality of linear actuators, and wherein said control box includes a programmable logic controller that stores commands and sequences for periodic and automatic adjustment of said linear actuator.

3. The mattress adjustment apparatus set forth in claim 2, wherein said remote control comprises sensors to detect and record motion.

4. The mattress adjustment apparatus set forth in claim 3, wherein said remote control records said motion and translates the recorded motion into a sequence for transmission to said control box, so that said linear actuators may be actuated by said control box in a manner that emulates said recorded motion.

5. The mattress adjustment apparatus set forth in claim 1, wherein said control box comprises a means for receiving wireless communications from said remote control.

6. The mattress adjustment apparatus set forth in claim 1, wherein said remote control is configured to receive previously programmed sequences from other remote control devices or from a global computer network, so that said sequences may be received from other users and transmitted to said control box.

7. A mattress adjustment apparatus comprising:
   a bed, said bed comprising a mattress and a bed frame;
   a series of linear actuators operatively connected said mattress, so that each linear actuator may raise or lower a portion of said mattress;
   a control box operatively connected to said linear actuators in order to control upward and downward motion of said actuators;
   a remote control in communication with said control box so that a user can transmit commands and sequences to said control box by using said remote control;
   wherein said remote control comprises a wireless mobile communication device with software to receive instructions and motion sequences from said user and transmit said commands and said sequences to said control box; and
   wherein said control box is programmed to produce periodic and automatic adjustment of said linear actuators, thereby adjusting positions of said mattress on a periodic basis.

8. The mattress adjustment apparatus set forth in claim 7, wherein said bed comprises two contiguous mattresses on said bed frame.

9. The mattress adjustment apparatus set forth in claim 7, wherein a first portion of said mattress may articulate independently with respect to a second portion of said mattress.

10. A method of adjusting a mattress, said method comprising the steps of:
    providing a programmable control box that is operatively connected to means for adjusting a position f a mattress on a bed;
    providing a programmable remote control that is in operable communication with said control box, wherein said remote control includes digital memory for storing code corresponding to multiple, individual motion sequences;
    providing at least one programmed sequence of motion within said programmable control box; and
    using said control box to actuate said adjustment means, so that said adjustment means periodically and automatically adjusts said mattress in accordance with said programmed motion sequence.

11. The method of adjusting a mattress set forth in claim 10, further comprising the step of programming a motion sequence into said programmable remote control and transmitting said motion sequence to said control box.

12. The method of adjusting a mattress set forth in claim 10, further comprising the step of providing said remote control with means for receiving a wireless communication, wherein said wireless communication comprises code that corresponds with a motion sequence.

13. The method of adjusting a mattress set forth in claim 10, further comprising the step of providing said remote control with means for detecting and recording physical motion.

14. The method of adjusting a mattress set forth in claim 13, further comprising the step of utilizing said remote control to detect and record physical motion, and translating said recorded motion into code corresponding to said recorded motion.

15. The method of adjusting a mattress set forth in claim 14, further comprising the step of transmitting said code corresponding to said detected and recorded motion from said remote control to said control box.

16. The method of adjusting a mattress set forth in claim 15, further comprising the step of utilizing said control box to actuate said adjustment means based on said code of said detected and recorded motion, so that said adjustment means causes said mattress to emulate said detected and recorded motion.

17. The method of adjusting a mattress set forth in claim 16, further comprising the steps of providing a series of programmed motion sequences that are digitally accessible to users via a global computer network; and allowing users to remotely access and digitally acquire at least e of said programmed motion sequences via said global computer network.

18. The method of adjusting a mattress set forth in claim 17, further comprising the step of allowing a user to upload a motion sequence from said remote control via said global computer network to said series of programmed motion sequences, so that other users may download said uploaded motion sequence with other remote controls.

* * * * *